United States Patent
Ito et al.

(10) Patent No.: US 6,417,624 B1
(45) Date of Patent: Jul. 9, 2002

(54) LIGHTING SYSTEM FOR VEHICLE

(75) Inventors: Masayasu Ito; Hitoshi Takeda; Soichi Yagi; Shuji Matsuura; Akihiro Mochizuki; Hiroki Ishibashi; Tomoyuki Ichikawa, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/650,394

(22) Filed: Aug. 29, 2000

(30) Foreign Application Priority Data

Aug. 30, 1999 (JP) .............................. 11-242976
Jun. 12, 2000 (JP) ...................... 2000-175302

(51) Int. Cl.[7] .............................................. H05B 41/46
(52) U.S. Cl. ............................. 315/88; 315/82; 362/20; 307/10.8
(58) Field of Search ................................ 315/312, 314, 315/315, 318, 65, 82, 83, 77, 88, 87; 307/10.8, 39; 362/254, 20

(56) References Cited

U.S. PATENT DOCUMENTS

| 3,558,972 | A | * | 1/1971 | Arai .............................. 315/83 |
| 3,631,441 | A | * | 12/1971 | Murphy ....................... 315/136 |
| 4,213,075 | A | * | 7/1980 | Ericson ........................ 315/83 |
| 4,728,861 | A | * | 3/1988 | Kurihara et al. .............. 315/83 |
| 5,068,570 | A | | 11/1991 | Oda et al. .................... 315/128 |
| 5,194,779 | A | * | 3/1993 | Segoshi et al. ............... 315/82 |
| 5,216,328 | A | * | 6/1993 | Lu ................................ 315/88 |
| 5,278,452 | A | | 1/1994 | Matsumoto et al. ........ 307/10.8 |
| 5,295,036 | A | | 3/1994 | Yagi et al. ...................... 361/79 |
| 5,828,177 | A | | 10/1998 | Toda et al. .................. 315/127 |
| 5,936,361 | A | | 8/1999 | Yamashita et al. .......... 315/308 |
| 5,973,457 | A | * | 10/1999 | Yamashita et al. .......... 315/225 |

FOREIGN PATENT DOCUMENTS

JP    Hei 4-141988    5/1992

* cited by examiner

*Primary Examiner*—Don Wong
*Assistant Examiner*—Ephrem Alemu
(74) *Attorney, Agent, or Firm*—Fish & Richardson P.C.

(57) ABSTRACT

A lighting system provides an auxiliary lighting circuit for turning on an auxiliary light source in place of the discharge lamp if the abnormality in the lighting circuit is detected.

17 Claims, 7 Drawing Sheets

LIGHTING SYSTEM FOR VEHICLE

BACKGROUND OF THE INVENTION

1. Field of the Invention

The present invention relates to an auxiliary light source as an alternative to a discharge lamp when a lighting circuit for controlling discharge lamps for a vehicle malfunctions.

2. Background of the Invention

A known lighting circuit for a vehicular discharge lamp, such as a metal halide lamp, includes a DC power circuit, a DC-AC converting circuit and a starting circuit (or a starter circuit).

As a light source for a vehicle, a plurality of discharge lamps needs to be controlled. If the lighting circuit is provided for each discharge lamp, cost and space may pose a problem. Therefore, a circuit is designed such that the discharge lamps are turned on by using a common lighting circuit. For example, as a light source for an automobile, the headlamps are provided on the right and left, front sides of the vehicle. As a result, at least two discharge lamps are required and a common lighting circuit is required for both discharge lamps. Moreover, to have a high beam (main beam) and a low beam (dipped beam) generated by separate discharge lamps (a four-lamp type illumination), a pair of discharge lamps would be required on the right and the left sides and a lighting circuit common to both of them would be necessary.

However, if the lighting circuit provided in common to the discharge lamps malfunctions, at worst, all the discharge lamps might go out. Therefore, the worst case scenario may pose a great problem in night driving.

Therefore, an object of the invention is to ensure sufficient illumination by an auxiliary light source in case the lighting circuit fails to turn the discharge lamps on.

SUMMARY OF THE INVENTION

An implementation of the invention provides a lighting system for a vehicle comprising a plurality of discharge lamps and a lighting circuit capable of controlling lighting operations of the discharge lamps at the same time, and an auxiliary lighting circuit for turning on an auxiliary light source in place of the discharge lamp when an abnormality in the lighting circuit is detected.

According to an implementation of the invention, therefore, if the abnormality in the lighting circuit of the discharge lamp is detected, the illumination necessary for driving can be obtained by turning the auxiliary light source on.

DETAILED DESCRIPTION OF THE PREFERRED EMBODIMENTS

Figure 1:
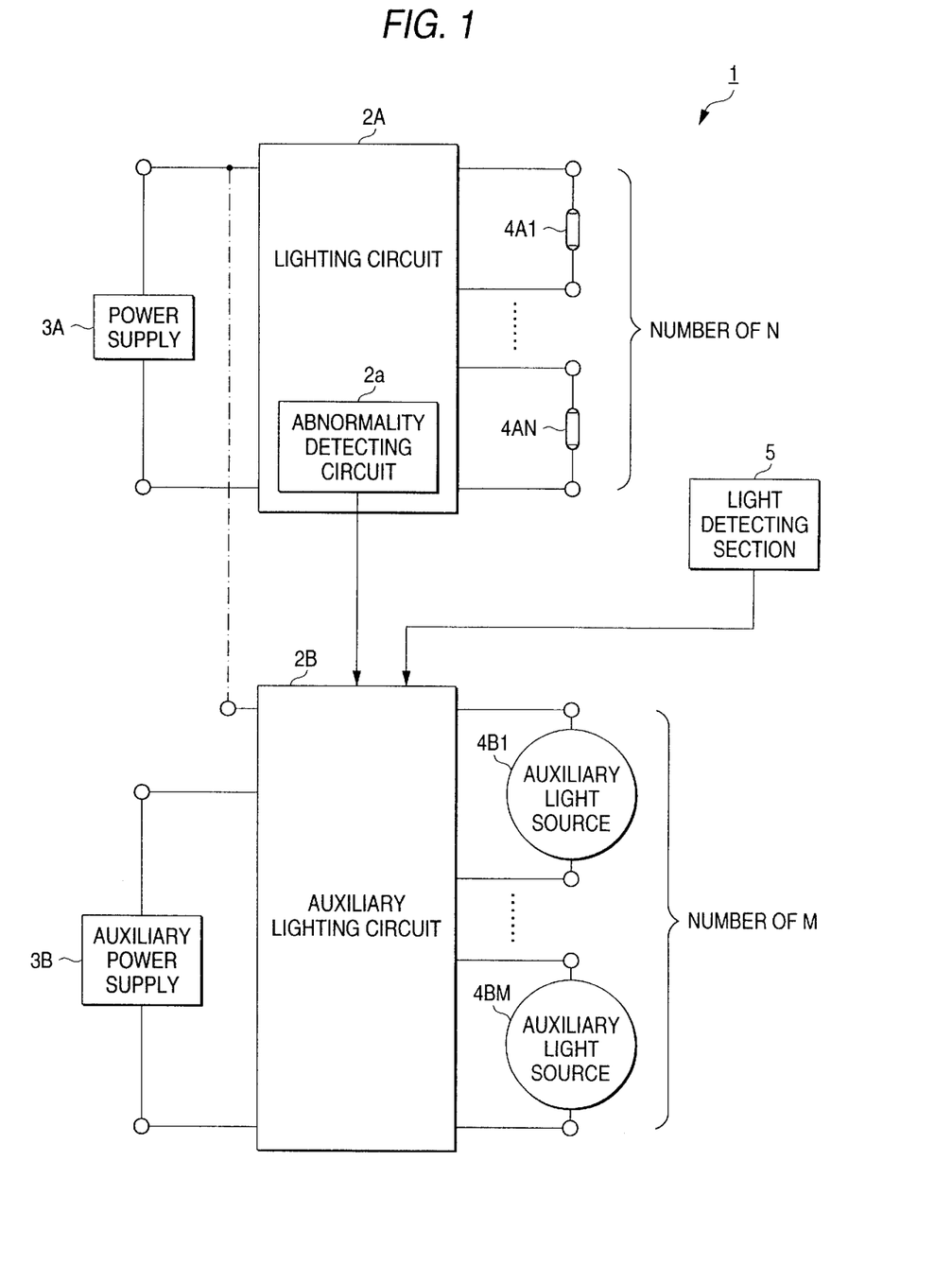
FIG. 1 is a circuit block diagram showing the basic structure of a lighting system for a vehicle according to an implementation of the invention.

FIG. 1 shows a basic structure of a lighting system for a vehicle according to an implementation of the invention, in which a lighting system 1 for a vehicle has a lighting circuit 2A to be used in common among a plurality of discharge lamps (only one lighting circuit is shown and a plurality of lighting circuits may be used).

The lighting circuit 2A serves to control the lighting operation of each discharge lamp 4Ai (i=1, 2, . . . , N, where N is a whole number) upon receipt of an input from a power supply 3A. The lighting circuit 2A is designed as a circuit capable of controlling the lighting operation of the discharge lamps at the same time. For example, while the lighting circuit 2A includes a DC power circuit (a switching power circuit), a DC-AC converting circuit and a starting circuit, any structure may be utilized.

The lighting circuit 2A includes an abnormality detecting circuit 2a for detecting abnormality, such as an abnormality in the lighting circuit itself, a defect in the discharge lamp, or lighting impossibilities. The abnormality detecting circuit 2a determines whether an abnormality is generated based on signals of a bulb voltage and a bulb current of the discharge lamp or signals of a current and a voltage in the circuit. If an abnormality is detected in the circuit, an auxiliary lighting circuit (described below) is alerted to the fact and the supply of power to the discharge lamp is blocked. Thus, a necessary safety measure is taken.

An auxiliary lighting circuit 2B serves to turn on auxiliary light sources in place of the discharge lamp when it senses an abnormality in the lighting circuit 2A by receiving an abnormality detection signal from the lighting circuit 2A. The circuit 2B can turn on or off one or more auxiliary light sources 4Bi (i=1, 2, . . . , M. M is a whole number) when power is received from a power supply 3A or an auxiliary power supply 3B (which is useful when the power supplying capability of the power supply 3A is compromised). Any kind of discharge lamp or incandescent lamp can be used for the auxiliary light source and any well-known circuit structure can be used for the auxiliary lighting circuit 2B. Referring to the numbers of discharge lamps and auxiliary light sources, M≦N is generally established. One auxiliary light source corresponds to one discharge lamp if M=N and a common auxiliary light source corresponds to a multiple sets of discharge lamps if M<N. If one lighting circuit is shared among a plurality of auxiliary light sources, the same problem as that in the lighting circuit 2A arises. Consequently, the lighting operation of the auxiliary light source cannot be guaranteed because of the failure of the lighting circuit. Therefore, it is preferable that a separate lighting circuit be provided for each auxiliary light source to enhance safety.

In FIG. 1, the auxiliary lighting circuit 2B receives information indicating occurrence of an abnormality on the bases of a signal sent from an abnormality detecting circuit 2a provided in the lighting circuit 2A to the auxiliary lighting circuit 2B. For example, a light detecting section (or light detecting means) 5 for detecting the lights-on or off state of the discharge lamp may be provided. An auxiliary light source may be turned on immediately when it is informed of the lights-off state of the discharge lamp though the discharge lamp, which should have been turned on, in response to a detection signal sent from the light detecting section 5 to the auxiliary lighting circuit 2B. In this case, the abnormality in the circuit is acquired from indirect information of the detection of the lights-off state of the discharge lamp.

According to the lighting system 1 for a vehicle, even if the discharge lamp 4Ai cannot be turned on because of the abnormality in the lighting circuit 2A, it is possible to maintain sufficient light by immediately turning on the auxiliary light source 4Bi.

It is preferable that a plurality of auxiliary light sources as an alternative to the discharge lamps be provided. However, having a plurality of auxiliary lights may pose a problem of cost and space.

The lighting system 1 for a vehicle, particularly for an automobile, may comprise the following structure.
(a) a structure in which a discharge lamp is used as a light source of a headlamp (a light source for high beam or a light source for low beam) and an auxiliary headlamp (a fog lamp, a clearance lamp or a cornering lamp) is used as an auxiliary light source.
(b) a structure in which a discharge lamp is used as one of the light sources for the high beam or the low beam constituting the light source for a headlamp, and the other light source is used as an auxiliary light source.

In (a) above, the preexisting auxiliary headlamp on a vehicle serves as an auxiliary to a discharge lamp used as a headlamp.

The structure in (b) further includes the following:
(b-1) The high beam is not turned on when the low beam is on. Therefore, the light source for the high beam as an alternative to the discharge lamp for the low beam. The discharge lamp can be used for the light source for the low beam and the light source for the high beam (a discharge lamp or an incandescent lamp) can serve as an auxiliary to the discharge lamp for low beam.
(b-2) If the headlamp is configured such that the low beam is not turned on simultaneously with the high beam, the light source for the low beam can be used as an alternative to the discharge lamp for high beam. That is, the discharge lamp can be used for the high beam, and the light source for the low beam (the discharge lamp or the incandescent lamp) can serve as an auxiliary to the discharge lamp for high beam.

For both (a) and (b), an existing light source can be used as the auxiliary light source. There is no need to provide a space for another lamp, and the existing light source can be efficiency utilized. In (a), if both of the headlamp and the auxiliary headlamp are lighting on, the headlamp is not irradiated when the lights-out of the discharge lamp. In other words, the light source of the auxiliary headlamp cannot completely function as an alternative to the discharge lamp. In this sense, (b) is preferable.

For (b-1) and (b-2), the light source for the low beam (or the light source for the high beam) is used in place of the discharge lamp used as the light source for the high beam (or the light source for the low beam). Therefore, since there is a control problem of a light distribution, an optical axis is controlled. In (b-1), the low beam is turned on by using the light source for the high beam, which can cause glare. Therefore, the optical axis needs to be lowered such that drivers of oncoming vehicles and pedestrians are not blinded by the light. On the other hand, in (b-2), the high beam is turned on by using the light source for the low beam. Therefore, the optical axis should be turned slightly upward to obtain a distant field of view.

Examples of controlling the direction of an optical axis include the following methods.
(i) A method of defining the desirable direction of the optical axis by tilting a lighting device itself with a driving mechanism.
(ii) A method of controlling the position of a light source in a lighting device or an optical member constituting an optical system (for example, a reflecting mirror or a part thereof, an inner lens and a shade (light shielding member)).

Figure 2:
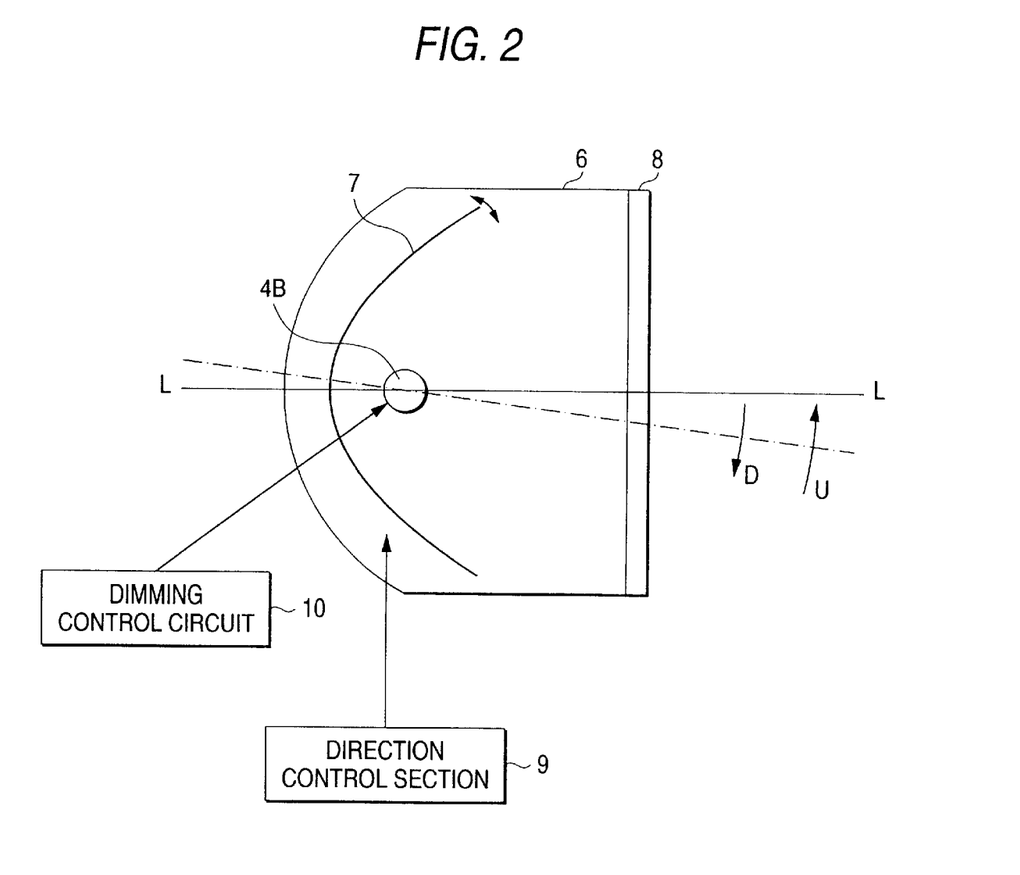
FIG. 2 shows a structure of a lighting device according to an implementation of the invention.

FIG. 2 shows an example of a lighting device, in which a light source 4B and a reflecting mirror 7 are provided in a lamp body 6 and in which a lens member (outer lens) 8 for covering an opening on a front surface of the lamp body 6 is provided.

In FIG. 2, a line L—L represents an optical axis of the lighting device. A direction control section 9 for changing the direction of the optical axis is provided on a vertical surface including the optical axis.

Examples of the direction control section 9 include a driving mechanism and a driving source (a so-called leveling regulating mechanism) for tilting the reflecting mirror through the control of the position of the reflecting mirror when method (ii) is employed.

In (b-1), the direction of the optical axis of a propagating section (having a reflecting mirror and a lens section) including the light source for the high beam is controlled by the direction control section 9. Consequently, if an abnormality in the lighting circuit of the discharge lamp is detected and the auxiliary light source (that is, the light source for the high beam) is to be turned on, the optical axis of the propagating section (shown in a one—dotted chain line) is turned downward from the original optical axis as shown in an arrow D in FIG. 2 (or a surface including the optical axis is tilted downward with respect to a horizontal plane).

In (b-2), the direction of the optical axis of the propagating section (having a reflecting mirror and a lens section) including the light source for the low beam is controlled by the direction control section 9. Consequently, if an abnormality in the lighting circuit of the discharge lamp is detected and the auxiliary light source (that is, the light source for the low beam) is to be turned on, the optical axis of the propagating section is turned upward from the original optical axis as shown in an arrow U in FIG. 2 (or a surface including the optical axis is tilted upward with respect to a horizontal plane).

In addition, a dimming control circuit 10 for controlling the intensity of light from the light source 4B (a circuit for defining the intensity of light through the control of power or current applied to the light source) may by provided to change the intensity of light instead of controlling the direction of the optical axis. The control of light intensity may also be coupled together with the direction control. In (b-1), for example, when an abnormality in the lighting circuit of the discharge lamp is detected so that the light source for the high beam acting as an auxiliary light source is to be turned on, an extinction control can be used to reduce the intensity of light rather than using as the light source for the high beam.

Figure 3:
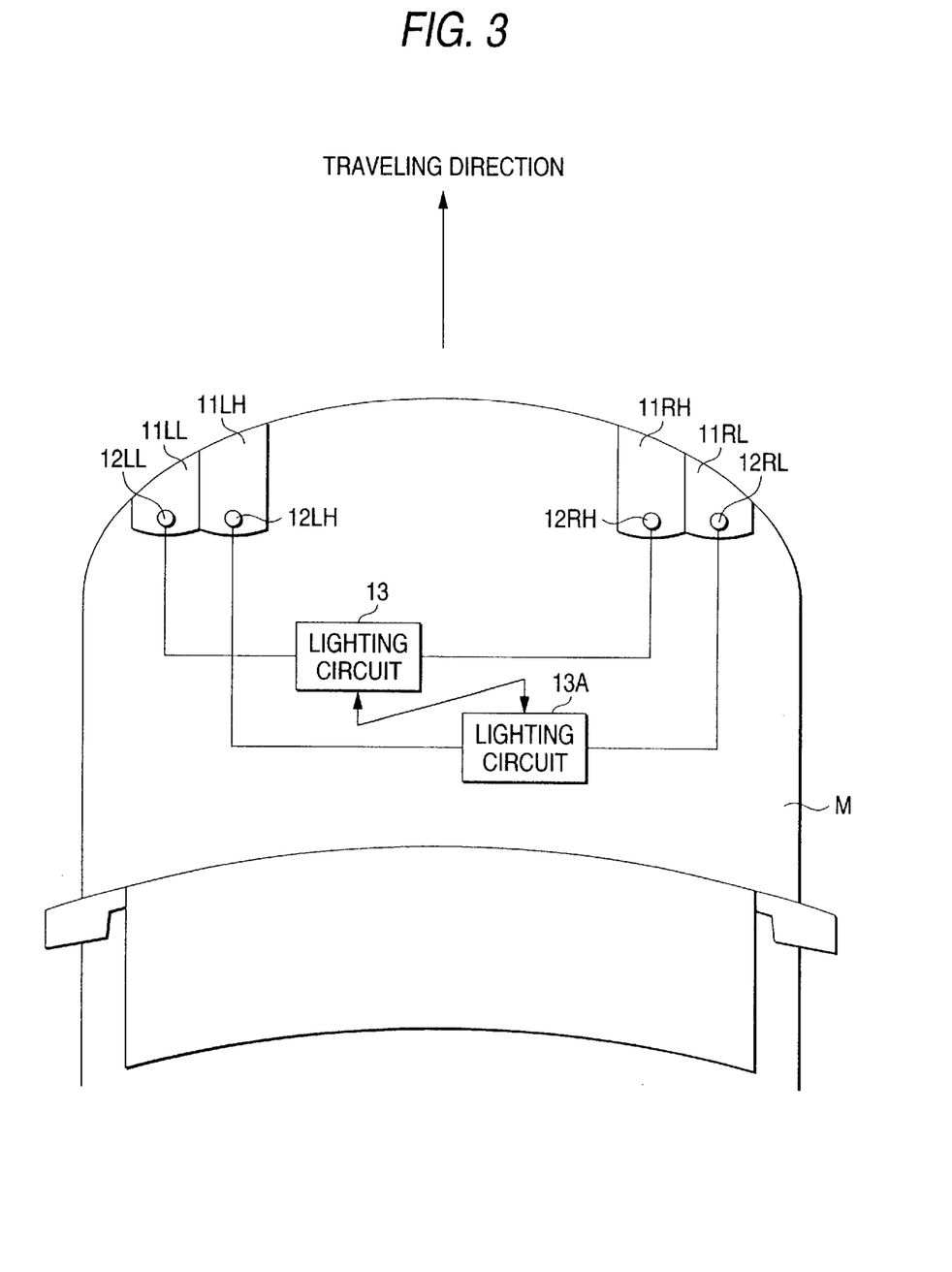
FIG. 3 illustrates an arrangement of a lighting device at the front of a vehicle according to an implementation of the invention.
Figure 4:
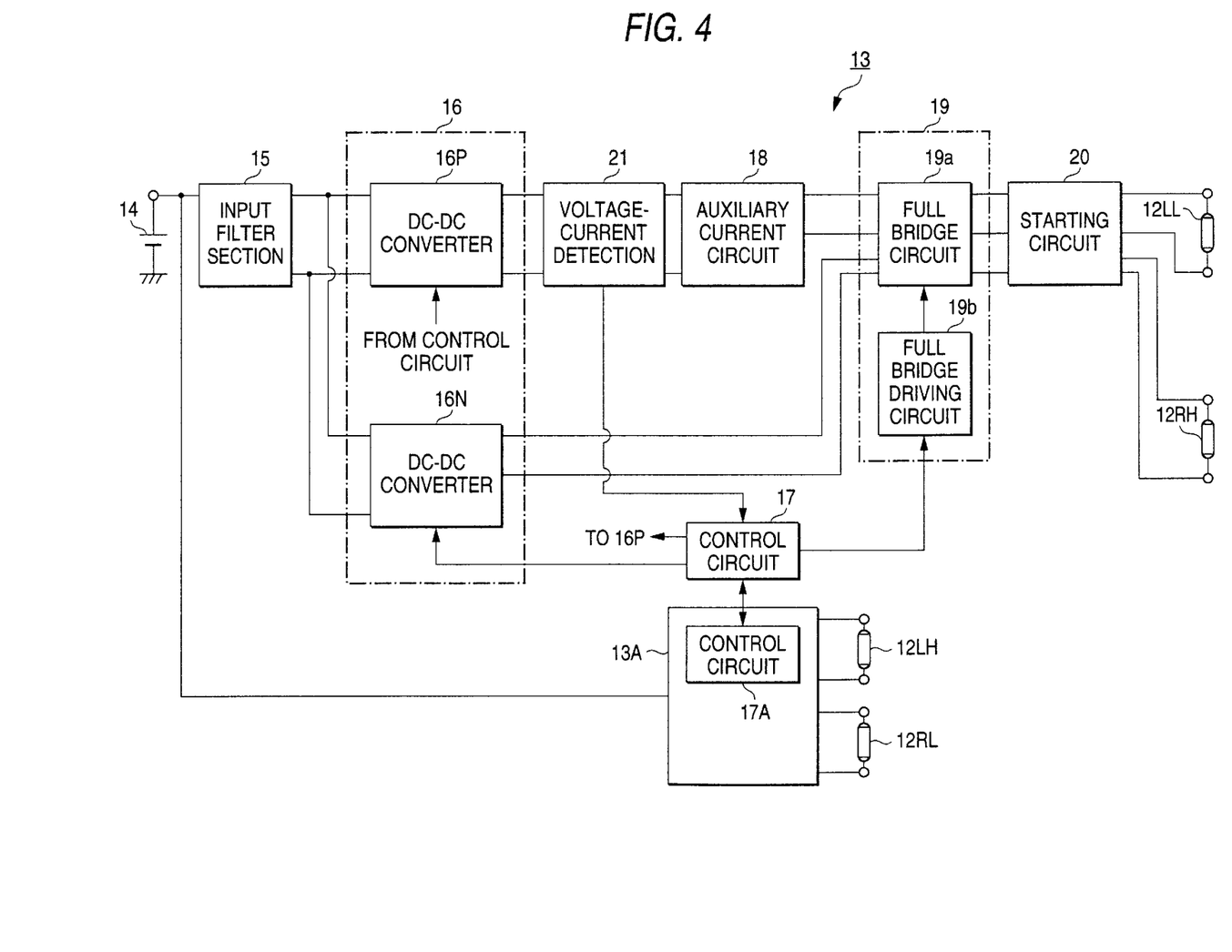
FIG. 4 shows a structure of a circuit block diagram according to an implementation of the invention.

FIGS. 3 and 4 show an example of an implementation according to the invention, in which the structure of (b-1) is employed.

FIG. 3 shows an arrangement of four lighting devices 11LL, 11LH, 11RL and 11RH provided in the front portion of a vehicle M and shows how the light sources of the devices are connected to lighting circuits. The lighting devices 11LL and 11LH are headlamps provided on the left in the traveling direction of the vehicle. The lighting device 11LL radiates the low beam (low beam) and the lighting device 11LH radiates the high beam (high beam). Moreover, the lighting devices 11RL and 11RH are headlamps provided on the right in the traveling direction of the vehicle. The lighting device 11RL radiates the low beam (low beam) and the lighting device 11RH radiates the high beam (high beam).

A lighting circuit 13 is provided to control the lighting operation of a light source 12LL in the lighting device 11LL and a light source 12RH in the lighting device 11RH. Moreover, lighting device 13A is provided to control the lighting operation of a light source 12LH in the lighting device 11LH and a light source 12RL in the lighting device 11LR. Both lighting circuits can carry out two-way communication to notify each other when an abnormality in the circuit is detected. Consequently, a fail safe function can be implemented.

Assume that the lighting circuit 13 is provided for the lighting devices 11LL and 11LH and the lighting device 13A is provided for the lighting devices 11RL and 11RH. Under this arrangement, the lighting devices provided on the right or left side of the vehicle may not turn when a lighting circuit malfunctions. For example, the lighting devices 11LL and 11LH may fail to turn on when the lighting circuit 13 malfunctions.

On the other hand, assume that the lighting circuit 13 is provided for the lighting devices 11LL and 11RL and the lighting circuit 13A is provided for the lighting devices 11LH and 11RH. Under this arrangement, the light source for the high beam acting as an auxiliary light source may not turn on at the same time if a lighting circuit malfunctions. For example, the lighting devices 11LH and 11RH cannot turn on when the lighting circuit 13A experiences a failure.

According to an arrangement shown in FIG. 3, even if the lighting circuit 13 has a failure, only the left lighting device 11LL and the right lighting device 11RH cannot turn on. More specifically, it is possible to avoid a situation where only the lighting device positioned on the left or right of the vehicle turns on (if this happens, the vehicle can be mistaken for a two-wheeled vehicle). Furthermore, the light source 12LH for the high beam can be used as an alternative light source of the light source 12LL for the low beam. On the other hand, the light source 12RH can be used as an alternative to the light source 12RL.

Thus, one of the two lighting circuits controls the light source for the low beam positioned on the left of the vehicle and the light source for the high beam positioned on the right of the vehicle. The other lighting circuit controls the light source for the high beam positioned on the left of the vehicle and the light source for the low beam positioned on the right of the vehicle. By using such a structure, the above-mentioned problem can be prevented.

In the arrangement shown in FIG. 3, a wiring required between the lighting circuit and the light source is longer than that required between the lighting circuit 13 and the lighting devices 11LL and 11LH, and the lighting circuit 13A is provided for the lighting devices 11RL and 11RH. Therefore, a disconnection may result. The disconnection can be detected by using a two-core cable for a high-tension code connecting an output terminal of the lighting circuit and the light source, one of the cores serving to supply power to the light source and the other core acting as a connecting line for detecting the disconnection.

FIG. 4 shows an example of a circuit structure. The lighting circuits 13 and 13A have the same structure. Therefore, only the structure of the lighting circuit 13 will be described.

In the lighting circuit 13, the terminal voltage of a battery 14 is supplied to a DC power section 16 through an input filter section 15. The DC power section 16 includes two DC-DC converters 16P and 16N. The converter 16P is used for outputting a positive electrode voltage and the converter 16N is used for outputting a negative electrode voltage.

A control circuit 17 is provided to control the output voltages of the DC-DC converters. A control signal generated from the control circuit 17 is sent to each converter.

The control circuit 17 is provided to control power supply to a discharge lamp based on the detection signals of a tube voltage and a tube current of the discharge lamp or their equivalent signals, for example, a detection signal sent from a voltage-current detecting section 21 provided in the rear stage of the DC-DC converter 16P. Examples of the circuit structure include a circuit in which an operational amplifier generates a signal for supplying much greater power than rated power in the early stage of the discharge lamp, gradually reducing the supplied power to perform constant power control with the rated power according to a control curve in a tube voltage-tube current characteristic chart for the discharge lamp, described in JP-A-4-141988 for example.

An auxiliary current circuit 18 is provided in the rear stage of the DC-DC converter 16P and serves to supply, to the discharge lamp, an energy stored in a capacitive load provided in the circuit when starting the discharge lamp, to help reliably a transition from aglow discharge to arc discharge.

A DC-AC converter 19 is constituted by a full bridge circuit 19a and a bridge driving circuit 19b and functions as a DC-AC converting circuit. More specifically, four semiconductor switch elements which are not shown are provided in the full bridge circuit 19a. The switch elements are divided into two sets and switching control is carried out reciprocally. Consequently, a DC input voltage is converted into a rectangular wave-shaped voltage. Therefore, the bridge driving circuit 19b generates a control signal to each switch element and operates upon receipt of a signal sent from the control circuit 17.

A starting circuit 20 is provided in common to the two discharge lamps 12LL and 12RH in the rear stage of the DC-AC converter 19. The detailed description of the structure will be omitted. A voltage generated by the discharge current of a capacitor during the breakdown of the switch element is boosted through a trigger transformer and the voltage thus boosted is applied to the discharge lamp.

If only the discharge lamp 12LL is to be turned on with the discharge lamp 12RH turned off, the ON/OFF state of each switch element in the full bridge circuit 19a is defined such that a positive electrode voltage is supplied to the discharge lamp, a voltage supplied to the discharge lamp 12LL is raised to have a necessary level through the DC-DC converter 16P, thereby generating a starting signal to actuate the discharge lamp 12LL. If only the other discharge lamp 12RH is to be turned on, the ON/OFF state of each switch element in the full bridge circuit 19a is defined such that the positive electrode voltage is supplied to the discharge lamp and a voltage supplied to the discharge lamp 12RH is raised to have a necessary level through the DC-DC converter 16P, thereby generating a starting signal to actuate the discharge lamp 12RH. By taking a sequence according to such a control method, it is sufficient that the auxiliary current circuit 18 may be provided only in the rear stage of the DC-DC converter 16P.

Moreover, the control circuit 17 determines whether the circuit or the discharge lamp has an abnormality based on the detection signal sent from the voltage-current detecting circuit 21 and notifies the control circuit 17A in the lighting circuit 13A of the fact that the abnormality is generated.

To control the lighting operation of the discharge lamps 12LH and 12RL, the lighting circuit 13A has the same structure as that of the lighting circuit 13. When the control circuit 17A in the lighting circuit 13A receives an abnormality detection signal from the control circuit 17, the discharge lamp 12LH is turned on as an alternative light source for the discharge lamp 12LL. In that case, it is a matter of course that a direction of irradiation is changed into a downward direction through the control of the optical axis of a reflecting mirror provided for the discharge lamp 12LH.

If an abnormality is generated in the lighting circuit 13A, the control circuit 17A in the lighting circuit 13A sends an abnormality detection signal notifying the control circuit 17 of the fact that the abnormality is generated. When the control circuit 17 receives the same signal, the discharge lamp 12RH is turned on as an alternative light source for the discharge lamp 12RL and a direction of irradiation is changed into a downward direction through the control of the optical axis of a reflecting mirror provided for the discharge lamp.

Examples of communication between the control circuits include wire or wireless type (optical communication or radio communication). It is desirable that a method that is not affected by disturbances such as electromagnetic interference or noises be employed.

A discharge lamp used as an auxiliary light source has been described in the present implementation. However, the discharge lamp can be replaced with an incandescent lamp (for example, a halogen lamp), or a light source for a high beam (a light source other than the discharge lamp) can be turned on through a driving circuit using a relay when an abnormality in the lighting circuit of the discharge lamp is detected.

Figure 5:
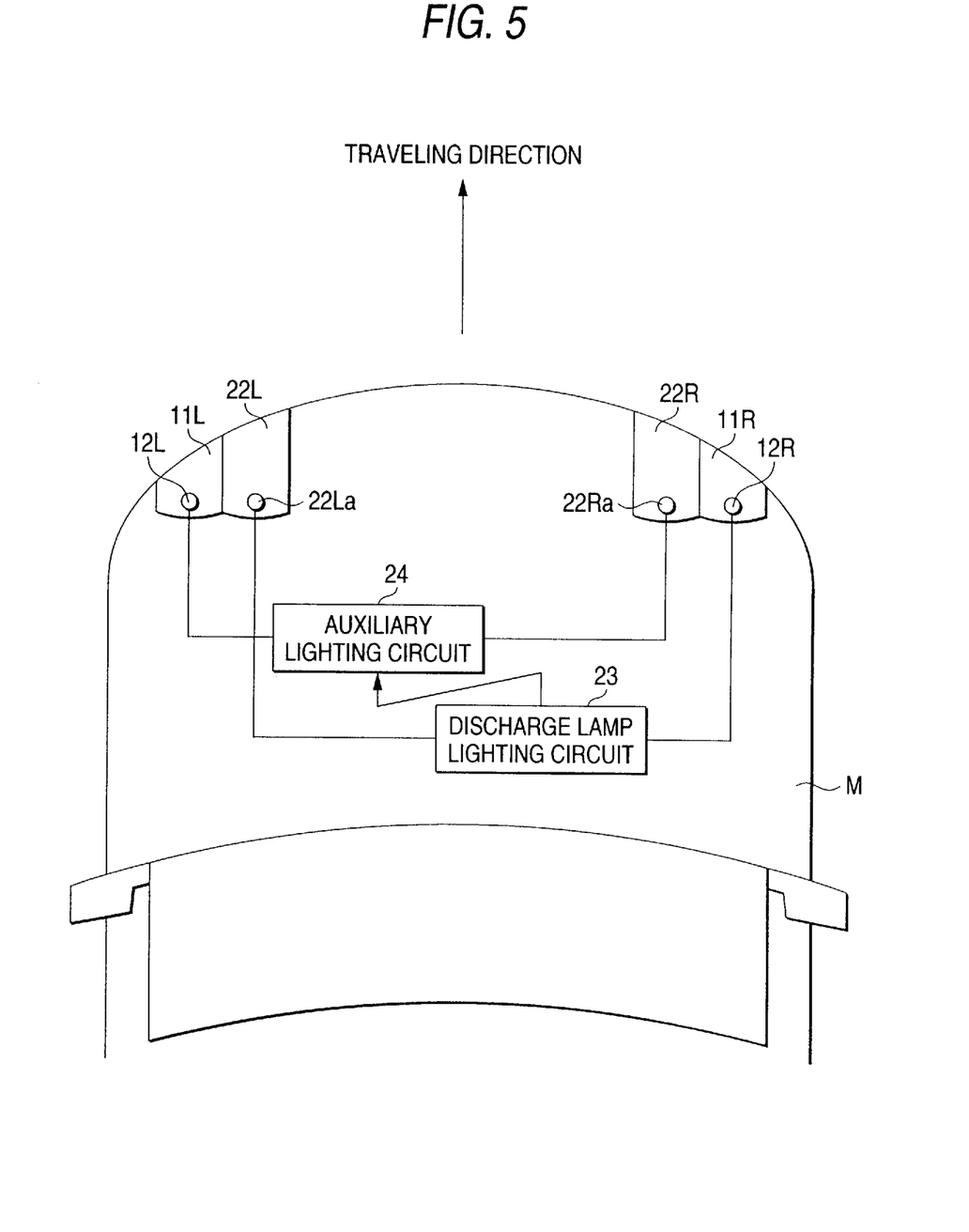
FIG. 5 illustrates another arrangement of the lighting device at the front of a vehicle according to an implementation of the invention.

FIG. 5 schematically shows the arrangement of four lighting devices 11L, 22L, 11R and 22R provided in the front portion of a vehicle M and the connections of their light sources and lighting circuits. The lighting device 11L is a headlamp for a low beam provided on the left side of the vehicle in the forward traveling direction. The lighting device 22L is a headlamp for a high beam, an auxiliary lighting device comprising an auxiliary lighting source for the lighting device 11L or an existent lighting device such as a fog lamp. The lighting device 11R is a headlamp for a low beam provided on the right side of the vehicle in the forward traveling direction The lighting device 22R is a headlamp for a high beam, an auxiliary lighting device comprising an auxiliary lighting source for the lighting device 11R or an existent lighting device such as a fog lamp.

A lighting circuit 23 is a discharge lamp lighting circuit provided to control a light source 12L (discharge lamp) in the lighting device 11L and a light source 12R (discharge lamp) in the lighting device 11R. The other auxiliary lighting circuit 24 is provided to control a light source 22La in the lighting device 22L and a light source 22Ra in the lighting device 22R. If an abnormality in the discharge lamp lighting circuit 23 is detected, the auxiliary lighting circuit 24 is notified of the fact. Consequently, the auxiliary light source is turned on in place of the discharge lamp. With the structure shown in FIG. 4, for example, the discharge lamps 12LL and 12RH are replaced with the discharge lamps 12L and 12R respectively, the discharge lamps 12LH and 12RL are replaced with the auxiliary light sources 22La and 22Ra respectively, and the auxiliary lighting circuit 24 is provided in place of the lighting circuit 13A. The auxiliary lighting circuit 24 may have such a structure that a relay is excited through a semiconductor switch element (a transistor) to be driven upon receipt of an abnormality detection signal sent from the discharge lamp lighting circuit 23. A contact ("a" contact) is closed so that power is supplied to the auxiliary light source corresponding to the discharge lamp and the light source is thus turned on.

A lighting system for a vehicle has a light source for a high beam and a light source for a low beam. If it is detected that those light sources cannot be turned on, it is preferable that the auxiliary light source be turned on. The reason is as follows.

If no auxiliary light source is provided and if a light source cannot turn on because of an abnormality, a driver of a vehicle may repair or exchange the problem light source and the lighting circuit. However, if the auxiliary light source is turned on in response to the failure of the lighting source to turn on, the driver may not become aware of the generation of the abnormality. If the abnormality is not addressed, the following problems may arise:

When the auxiliary light source fails to turn on, there would be no further alternative lighting means. The driver could be forced to drive in the dark.

If driver does not become aware of the abnormality for a long period of time, the increased load to the power supply would lead to wasteful power consumption. Also, there is a chance of an electric shock.

If any one of the lighting sources (discharge lamps) can be turned on, the auxiliary light source should not be turned on and the damaged light source should be exchanged to eliminate the above-mentioned drawbacks. Preferably, the auxiliary light source should be turned on in a worst case where not one of the light sources can be turned on.

Figure 6:
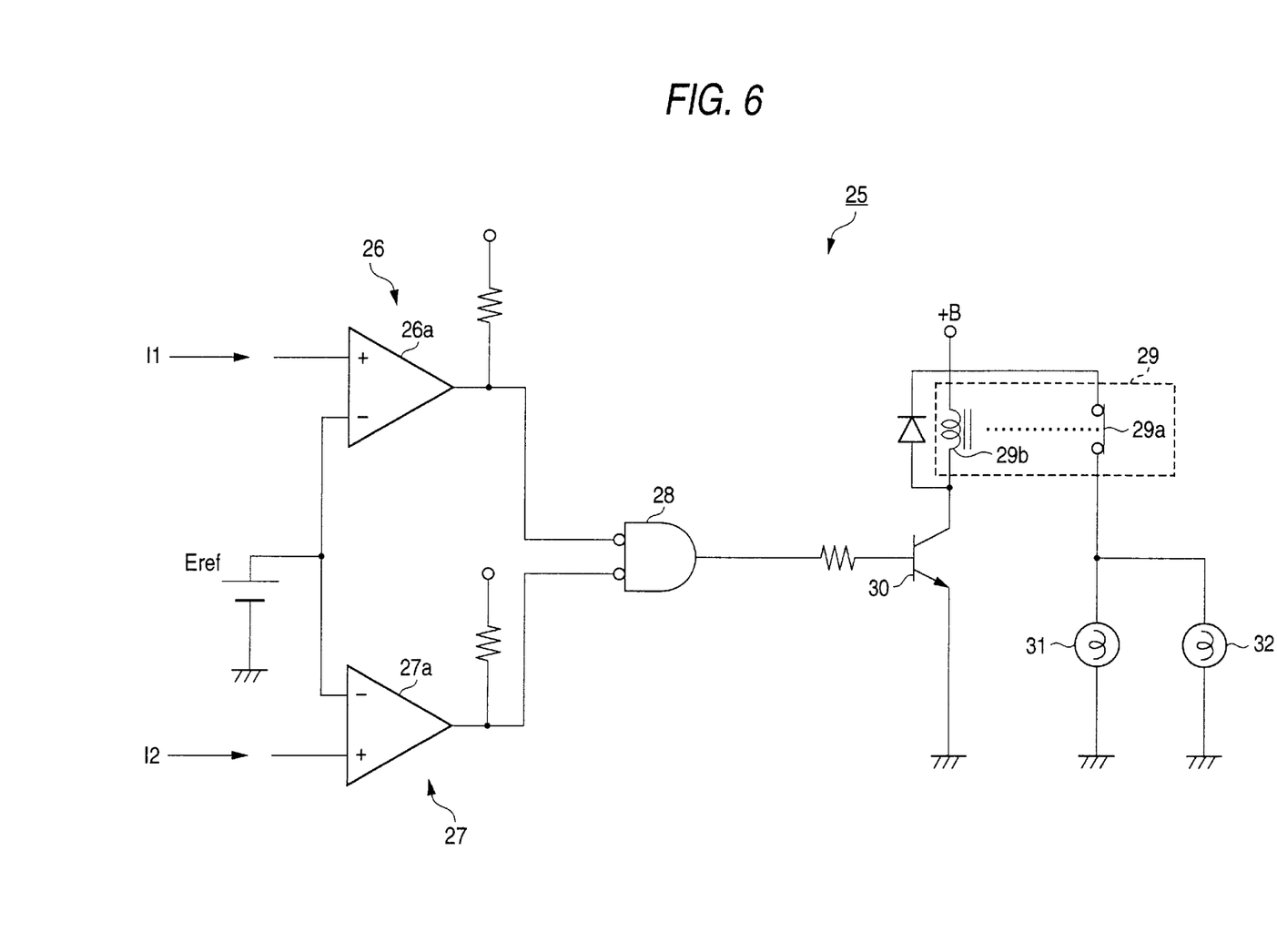
FIG. 6 shows a structure of a circuit for turning on an auxiliary light source when any of the discharge lamps cannot be turned on according to an implementation of the invention.

FIG. 6 shows an example 25 of a circuit structure for the above-mentioned operation. Two discharge lamps are used as main light sources. If it is detected that any of the discharge lamps cannot be turned on, an auxiliary light source is turned on.

In FIG. 6, a detection signal "I1" denotes a current detection signal related to a first discharge lamp (for example, a light source of a lamp for a low beam on the left) and a detection signal "I2" denotes a current detection signal related to a second discharge lamp (for example, a light source of a lamp for a low beam on the right). The following circuit sections are provided (figures in parentheses denote designations).

Non-lighting detecting circuit (26) for detecting the non-lighting state of the first discharge lamp.

Non-lighting detecting circuit (27) for detecting the non-lighting state of the second discharge lamp.

2-input NAND (NAND) circuit (28).

Relay (29) and relay driving transistor (30).

Auxiliary light source (31, 32) such as incandescent lamp.

The non-lighting detecting circuit 26 for the first discharge lamp serves to send an L level signal to the NAND circuit 28 in a rear stage when it is detected that the current detection signal I1 is input and the discharge lamp cannot be turned on. More specifically, the current detection signal I1 is sent to a positive input terminal of a comparator 26a and is compared with a predetermined reference voltage "Eref" (which is shown by a symbol of a constant voltage source in the drawing). The reference voltage Eref is set to be a threshold such that the output signal of the comparator 26a is set to have the H level when the discharge lamp is on and the output signal of the comparator 26a is set to have the L level when the discharge lamp is off.

Similarly, when the non-lighting detecting circuit 27 for the second discharge lamp inputs the current detection signal I2 and detects that the same discharge lamp cannot be turned on, it sends the L level signal to the NAND circuit 28 in the rear stage. In other words, the current detection signal I1 is sent to a positive input terminal of a comparator 27a and is compared with the reference voltage Eref. When the discharge lamp is on, the output signal of the comparator 27a is set to have the H level. When the discharge lamp is off, the output signal of the comparator 27a is set to have the L level.

Accordingly, the output signal of the NAND circuit 28 of an L active 2-input is set to have the H level only when any of the discharge lamps cannot be turned on, and is sent to a base of an NPN transistor 30 in the rear stage. The transistor 30 has an emitter grounded and a collector connected to a power terminal having a voltage "+B" through a coil 29b of a relay 29. Therefore, when the transistor 30 is turned on, the relay 29 operates to close the "a" contact 29a so that power is supplied from the power terminal to the auxiliary light sources 31 and 32. Consequently, the auxiliary light source 31 is turned on for the first discharge lamp and the auxiliary light source 32 is turned on for the second discharge lamp.

Thus, the output signal of the NAND circuit 28 is set to have the L level in the state in which one of the two discharge lamps is turned on in the circuit. Therefore, the auxiliary light sources 31 and 32 are not turned on.

To temporarily turn off the auxiliary light source immediately after the lighting switch is turned on, a time constant circuit and a timer circuit which start to operate when a power supply is turned on are provided such that the output signal of the non-lighting detecting circuit is ignored before a predetermined time passes (for example, a signal having the L level before a predetermined time passes and having the H level after the same time passes by setting a power-on time as a staring point is generated and an ANDed signal of the signal thus generated and the output signal of the NAND circuit 28 is sent to the transistor 30).

Moreover, the conditions for turning on the auxiliary light source are as follows:

When the discharge lamps are used as the light sources for the low beam and any of them cannot be turned on.

When the discharge lamps are used as the light sources for the high beam and any of them cannot be turned on.

When the discharge lamps are used as the light sources for the dipped and high beams and any of them cannot be turned on.

Moreover, when the auxiliary light source is to be turned on, preferably, the driver should be notified of an abnormality in the lighting operation of the discharge lamp by a display means (indicator). If it is detected that the discharge lamp cannot be turned on because of an abnormality in the discharge lamp or the lighting circuit, careful consideration should be given such that the driver of the vehicle can be informed of the abnormality to exchange the discharge lamp or repair the lighting circuit when the auxiliary light source is to be turned on.

Figure 7:
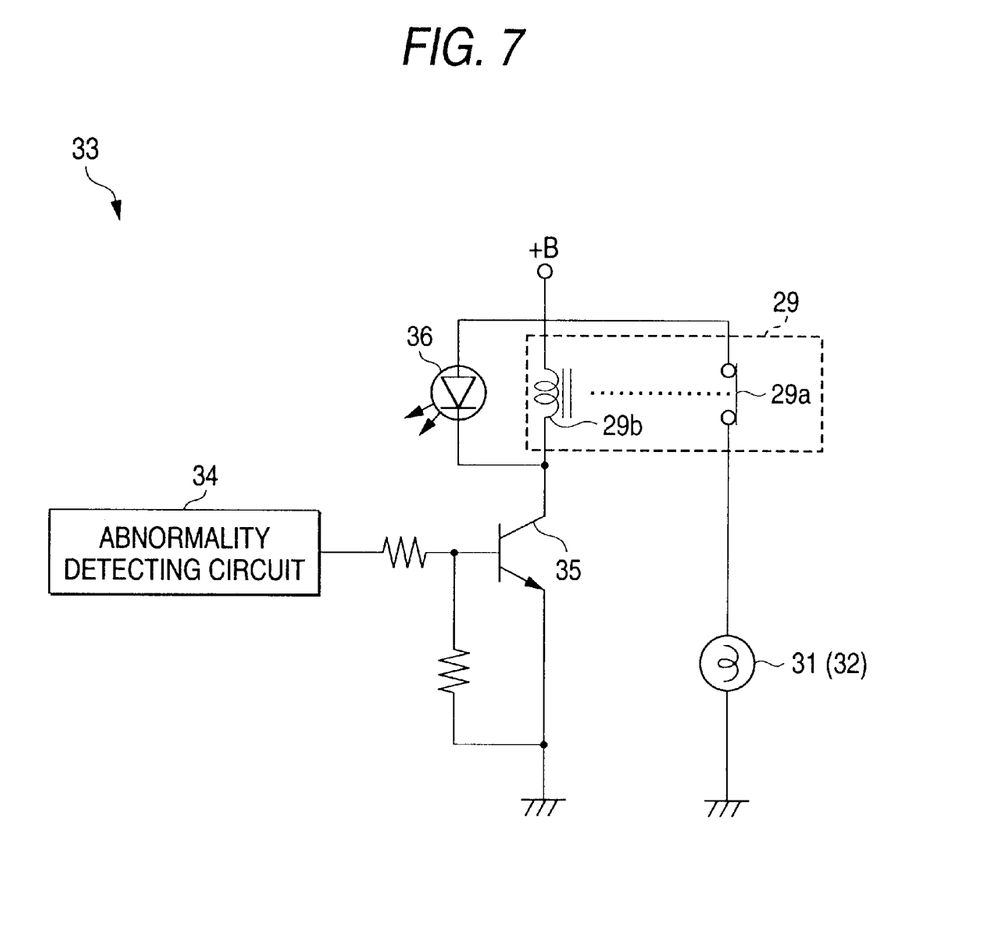
FIG. 7 shows a structure of a circuit for giving a notice that an abnormality is generated when the auxiliary light source is to be turned on according to an implementation of the invention.

FIG. 7 shows an example 33 of a circuit structure for the above-mentioned operation.

If the abnormal state of the discharge lamp or circuit is detected through the abnormality detecting circuit 34, an NPN transistor 35 is brought into the ON state in response to an output signal. The coil 29b of the relay 29 for turning on the auxiliary light source and a light emitting device 36 (such as a light emitting diode or an incandescent lamp) to the collector of the transistor 35, and these are connected in parallel and a predetermined voltage (shown by "+B" in the drawing) is supplied. Therefore, when the transistor 35 is turned on so that the relay 29 operates to close the contact 29a, the auxiliary light source 31 (or 32) is turned on and the light emitting device 36 emits light at the same time. The light emitting device 36 constitutes the indicator for informing the driver of the abnormality in the lamp. Therefore, when the driver becomes aware of the abnormality, he (or she) can immediately recognize that the auxiliary light source is turned on because of the generation of the abnormality.

For the method of detecting the abnormal state, the values of a voltage and a current which are applied to the discharge lamp are monitored to detect that they are kept in a specified tolerance or not, or the abnormality in the current value in the circuit and the stop of the operation are detected and an input voltage is detected to decide the generation of the abnormality. Thus, since various methods are known and any method of detecting an abnormality can be used in the invention, detailed description thereof will be omitted.

With the structure shown in FIG. 7, the relay coil and the light emitting device are driven through one transistor. Furthermore, it is also possible to carry out various implementations in which a separate driving transistor may be provided or a circuit for flashing a light emitting device and a circuit for giving an alarm are combined.

According to the first implementation of the invention, if the abnormality in the lighting circuit of the discharge lamp is found, the auxiliary light source is turned on in place of the discharge lamp.

According to the second implementation of the invention, the light source for the high beam or the light source for the low beam is also used as the auxiliary light source. Consequently, it is possible to simplify the structure and to enhance the availability of the light source.

According to the third implementation of the invention, if the light source for the high beam is used as the auxiliary light source, the optical axis is turned downward to prevent glare from being inadvertently imparted to road users.

According to the fourth implementation of the invention. the auxiliary light source is not turned on if a part of the light source for the low beam and the light source for the high beam cannot be turned on. Therefore, it is possible to obtain an advantage that the driver can easily become aware of the generation of the abnormality.

According to the fifth implementation of the invention, a notice that the lighting operation of the discharge lamp has an abnormality can be given to the driver. Consequently, the drive can be alerted to repair and exchange the discharge lamp and the lighting circuit.

Several implementations of the invention have been described herein, but it should be understood that various additions and modifications could be made which fall within the scope of the following claims.

What is claimed is:

1. A lighting system for a vehicle comprising:
   a plurality of discharge lamps;
   a lighting circuit for controlling lighting operations of the discharge lamps;
   an auxiliary lighting circuit for turning on an auxiliary light source in place of one of the discharge lamps when an abnormality in the lighting circuit is detected; and
   a direction control member for controlling a direction of an optical axis of the auxiliary light source;
   wherein when an abnormality in the lighting circuit of the discharge lamps is detected and the auxiliary light source is to be turned on, the direction of the optical axis of the auxiliary light source is turned downward by the direction control member.

2. The lighting system for a vehicle according to claim 1 wherein the discharge lamps is for low beam, and the auxiliary light source is used for high beam and is used as the auxiliary light source.

3. The lighting system for a vehicle according to claim 1 wherein the discharge lamps is for high beam, and the auxiliary light source is used for low beam and is used as the auxiliary light source.

4. The lighting system for a vehicle according to claim 3, further comprising a dimming control circuit for controlling the intensity of light from the light source.

5. A lighting system for a vehicle comprising:

a plurality of discharge lamps;

a lighting circuit for controlling lighting operations of the discharge lamps;

an auxiliary lighting circuit for turning on an auxiliary light source in place of one of the discharge lamps when an abnormality in the lighting circuit is detected; and a direction control member for controlling a direction of an optical axis of the auxiliary light source;

wherein when an abnormality in the lighting circuit of the discharge lamps is detected and the auxiliary light source is to be turned on, the direction of the optical axis of the auxiliary light source is turned upward by the direction control member.

6. The lightening system for a vehicle according to claim 5 wherein one of the discharge lamps is for high beam and another discharge lamp is for low beam.

7. The lighting system for a vehicle according to claim 6 wherein the auxiliary light source is turned on when it is detected that any of the light sources for low beam and for high beam cannot be turned on.

8. The lighting system for a vehicle according to claim 7 wherein the auxiliary light source is a light source other than the discharge lamp for low beam or for high beam.

9. The lighting system for a vehicle according to claim 8 wherein the auxiliary lighting system comprises a fog lamp.

10. The lighting system for a vehicle according to claim 8 wherein the auxiliary lightening system comprises a clearance lamp.

11. The lighting system for a vehicle according to claim 8 wherein the auxiliary lightening system comprises a cornering lamp.

12. The lighting system for a vehicle according to claim 1 further comprising:

a display means for indicating that the discharge lamp has an abnormality.

13. The lighting system for a vehicle according to claim 2, further comprising a dimming control circuit for controlling the intensity of light from the light source.

14. The lighting system for a vehicle according to claim 13, wherein said dimming control circuit reduces the intensity of light rather than using as the light source for the high beam when an abnormality in the lighting circuit of the discharge lamp is detected and the light source for the high beam acting as the auxiliary light source is turned on.

15. A lighting system for a vehicle comprising:

a plurality of discharge lamps;

a lighting circuit for controlling lighting operations of the discharge lamps; and an auxiliary lighting circuit for turning on an auxiliary light source in place of one of the discharge lamps when an abnormality in the lighting circuit is detected;

wherein said lighting circuit controls lighting operations of the discharge lamp at one side of the vehicle and the auxiliary light source at another side of the vehicle, while the auxiliary lighting circuit controls lighting operations of the auxiliary light source at the one side of the vehicle and the discharge lamp at another side of the vehicle.

16. The lighting system for a vehicle according to claim 15, wherein when an abnormality is detected, two-way communication is carried out between said lighting circuit and said auxiliary lighting circuit to notify the abnormality each other.

17. A lighting system for a vehicle comprising:

a plurality of discharge lamps;

a lighting circuit for controlling lighting operations of the discharge lamps;

an auxiliary lighting circuit for turning on an auxiliary light source in place of one of the discharge lamps when an abnormality in the lighting circuit is detected; and a direction control member for controlling a direction of an optical axis of the auxiliary light source;

wherein one of the discharge lamp is for high beam and another discharge lamp is for low beam; only when an abnormality is detected for both the low beam and the high beam discharge lamps such that they cannot be turned on, the direction of the optical axis of the auxiliary light source is turned downward by the direction control member, and the auxiliary light source is turned on.

* * * * *